(12) United States Patent
Song et al.

(10) Patent No.: US 8,358,282 B2
(45) Date of Patent: Jan. 22, 2013

(54) OBJECT DETECTION DEVICE

(75) Inventors: Willie Song, Penang (MY); Michael Brosnan, Fremont, CA (US); Wei-Liang Chee, Perak (MY); Wui Pin Lee, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 452 days.

(21) Appl. No.: 12/641,529

(22) Filed: Dec. 18, 2009

(65) Prior Publication Data

US 2011/0147102 A1   Jun. 23, 2011

(51) Int. Cl.
*G06F 3/041* (2006.01)
(52) U.S. Cl. ............... 345/173; 345/175; 178/18.09; 250/221
(58) Field of Classification Search .............. 345/173, 345/175; 178/18.09; 250/221
See application file for complete search history.

(56) References Cited

U.S. PATENT DOCUMENTS

| | | | |
|---|---|---|---|
| 5,243,182 A * | 9/1993 | Murata et al. | 250/222.1 |
| 6,525,306 B1 * | 2/2003 | Bohn | 250/221 |
| 6,924,791 B1 * | 8/2005 | Nicolas et al. | 345/179 |
| 7,274,808 B2 | 9/2007 | Baharav et al. | |
| 2006/0086896 A1 | 4/2006 | Han | |
| 2006/0108514 A1* | 5/2006 | Maruyama | 250/221 |
| 2007/0040108 A1 | 2/2007 | Wenstrand | |
| 2007/0052684 A1 | 3/2007 | Gruhlke et al. | |
| 2008/0079687 A1 | 4/2008 | Cernasov | |

* cited by examiner

*Primary Examiner* — Latanya Bibbins

(57) ABSTRACT

A device for detecting the presence of an object is provided. The device includes a light source, a current controller coupled to the light source, a sensor and a pattern detection engine. The current controller sets to provide the light source with a drive current having a pattern. The sensor is operable to receive light, notably light reflected from an object at the detection area and subsequently generates a signal in response to the light received. The pattern detection engine receives the signal from the sensor and subsequently reports the presence of the object upon determining the presence of the pattern in the signal. The object detection system is further configured to provide a navigation operation when an object is detected at the detection area.

17 Claims, 5 Drawing Sheets

OBJECT DETECTION DEVICE

BACKGROUND

Many conventional electronic devices, such as small handheld devices, desktop and notebook computers, mobile handsets, PDA and digital music players, have an input mechanism for navigating a cursor or maneuvering a graphical user interface (GUI) function on such a device. By far, the most popular choice of navigation mechanism for input devices is the optical navigation system. In general, an optical input device tracks the relative movement between a navigation surface, such as a mouse pad or a work surface, and an image sensor within the optical input device. Light is illuminated towards the navigation surface or a target object by a light source such as a light emitting diode. Images of the illuminated navigation surface or multiple frames of digital image data of the illuminated target object are captured by a sensor and subsequently processed and further translated as a cursor movement on the input device.

More recently, the optical finger navigation system has been widely adopted in many handheld portable devices to provide navigation function by simply moving a finger on a finger interface surface of such portable device. The operational concept of such an optical finger navigation system is quite similar to a conventional optical mouse with the sensor for such finger navigation system is generally positioned facing up from the device. And in contrast to the tracking on a working surface with a typical mouse, the tracking surface of the optical finger navigation system is a user's finger. The navigation system translates the finger movement to a motion of a cursor or a navigation function on the screen of the portable device. While an optical finger navigation system can be effective, such systems are still prone to erroneous cursor movements caused by sunlight or other unwanted ambient light striking the sensor.

Another known limitation in many finger navigation devices is the unintended cursor movement when a finger is initially placed on the finger interface surface or as it is being lifted off the finger interface surface. The placing and lifting of a finger can cause unintended cursor jittering or a sudden jump of the cursor. In addition, such erroneous cursor movement is more obvious when the speed of the finger movements is high.

SUMMARY

In one embodiment, an object detection device is provided for detecting the presence of a navigation object, such as a user's finger. One benefit of detecting the presence of an object occurs when no object is detected. When this occurs, light striking the sensor can be ignored for navigation purposes, even if the sensor would otherwise indicate motion. As a result, erroneous cursor movement caused by ambient light or the placing or removing of a finger on or off the navigation surface can be reduced or eliminated.

The object detection device can be adapted for use by a portable electronic device to enable optical finger navigation operations. The object detection device includes a light source, a sensor and a pattern detection engine. The light source is coupled to a current controller; the current controller provides the light source with a drive current having a pattern. One pattern is a series of alternating high and low current intensities with a known timing, thereby driving the light source to emit light having a similar emission pattern. The sensor is operable to receive light, notably light reflected from an object at the detection area and subsequently generates a signal in response to the light received. The pattern detection engine receives the signal from the sensor and subsequently reports the presence of the object upon determining the presence of the pattern in the signal.

In an additional embodiment, the object detection device is coupled to an optical input device to provide a navigation operation. The optical input device has a navigation engine coupled with the pattern detection engine for providing a navigation operation when an object is detected. In addition, the navigation engine may be configured to recognize a gesture or a sequence of the movements made by the object on the detection area and translates these movements into a navigation operation such as a click event or a four way rocker function.

In another embodiment, a method for detecting an object involves providing a drive current having a pattern to a light source for emitting light, receiving the emitted light reflected from an object at a detection area, generating a signal in response to the light received and subsequently reporting the presence of an object upon determining the presence of the pattern in the signal. The method also includes reporting the presence of the object upon determining the presence of the pattern in the signal within a predetermined tolerance.

BRIEF DESCRIPTION OF THE DRAWINGS

Throughout the description and figures, similar reference numbers may be used to identify similar elements.

DETAILED DESCRIPTION

Figure 1:
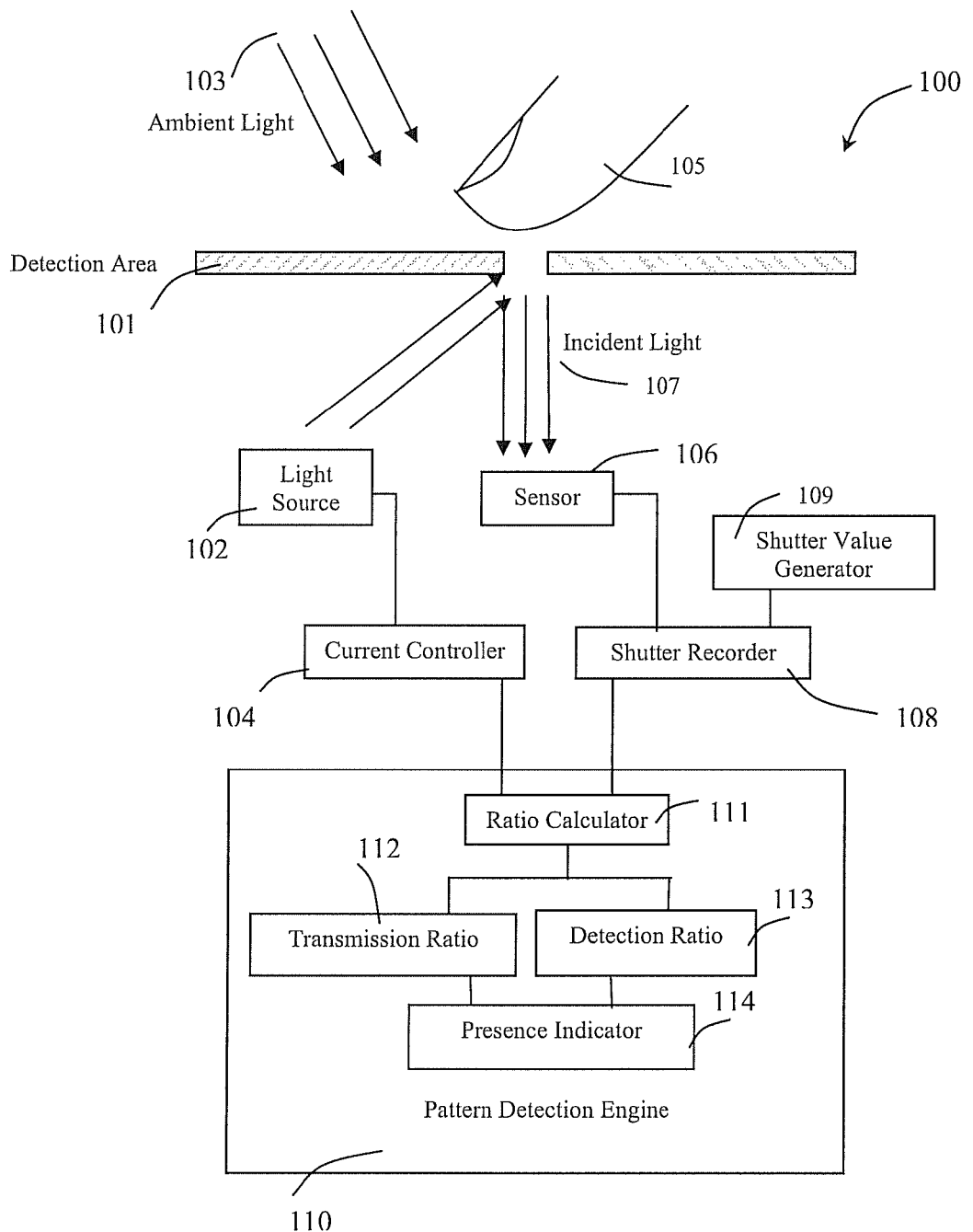
FIG. 1 illustrates a schematic block diagram of one embodiment of an object detection device.

Although certain component parts are shown in conjunction with the object detection device 100 of FIG. 1, other embodiments may implement fewer or more component parts for providing a similar object detection function. FIG. 1 illustrates a schematic block diagram of one embodiment of an object detection device 100. The object detection device 100 includes a light source 102 for emitting light; a current controller 104 coupled to the light source 102, a sensor 106 and a pattern detection engine 110. The object detection device 100 may implement an integrated single chip system whereby the current controller 104, the light source 102, the sensor 106 and the pattern detection engine 110 can be integrated as one single chip.

Object detection device 100 is suitable for a small handheld electronic appliance such as a mobile handset, PDA, a digital music player or other electronic devices that require a navigation function, for example navigating a cursor or manipulating a graphical user interface function on the device. The object detection device 100 includes a detection area 101 which provides a location for a user to place an object such as a finger 105 for operating the navigation function on the electronic device. Although other body parts or various non human objects such as a stylus could be used to operate the same, however to simplify illustration, human finger 105 is used to represent the object throughout the description of the embodiments and their figures.

As described in more detail below, in another embodiment, the object detection device 100 is configured to allow navigation operation only when a finger 105 is reported present on the object detection device 100 for preventing unwanted false motion, such as may be triggered by ambient light 103.

The light source 102 is configured to emit light pulses towards the detection area 101 in response to an applied current having a pattern; the light source 102 can be any suitable source of electromagnetic radiation, which is capable of emitting light at a desirable wavelength and intensity. In general, the light source 102 can be a coherent or a non-coherent light source. The selection of light source 102 is preferably based on its capability to provide an optimum intensity and to produce a maximum light reflection from the finger 105 placed on the detection area 101 onto the sensor 106 for that device. The light source 102 may be a visible or a non-visible light (e.g. IR LED) light source, and certain applications may benefit from more than one light source.

The current controller 104 is coupled to the light source 102 and is configured to provide the light source 102 with a drive current having a pattern. The drive current pattern includes alternating high and low intensities with a known timing. The current controller 104 is variously embodied and may include a current controlling circuit or a current driver circuit for regulating the current supplied to the light source 102. In one embodiment, the current controller 104 is configured to provide a drive current having a pattern consisting of distinctively high and low current intensity alternatively under a known timing to the light source 102, causing the light source 102 to emit light pulses of a corresponding high and a low intensity. The current controller 104 may consist of a current controlling circuitry which may be implemented in a variety of different ways that are known in the art.

The sensor 106 includes a plurality of photosensitive electrodes and is coupled with a shutter recorder 108. In one embodiment, the sensor 106 is operable to receive light, notably light reflected from the finger 105 at the detection area 101 and subsequently generates a signal in response to the respective light received. Additionally, the sensor 106 may also comprise an array of pixel sensors to provide navigation operation by capturing the incident light 107 coming from the detection area 101 in the form of image data whereby individual pixels capture a portion of the image. For example, the sensor 106 captures a series of frame images representing surface features of the finger 105, placed on the detection area 101. The sensor 106 then compares successive image frames to determine the movement of the image features between frames. The sensor 106 then processes the image feature movement between the frames in terms of movement vectors in the directional delta X and delta Y corresponding to the movement of the finger 105 relative to the object detection area 101. The sensor 106 may be a Charge Couple Device (CCD), a Complimentary Metal Oxide Semiconductor (CMOS) or other type of optical sensor known in the art.

In one embodiment, the sensor 106 includes a shutter recorder 108 configured to record signals generated by the sensor 106 in response to the net light received by the sensor 106. The shutter recorder 108 records the signals as shutter values for the incident light 107 associated with the timings in the drive current pattern or in another manner synchronous with the light pulses emitted by the light source 102. In an operational embodiment, the shutter recorder 108 registers a shutter value for the incident light 107 receive by the sensor when the light source 102 emits a light pulse. The shutter recorder 108 has a shutter value generator 109 for generating the shutter value for the light received by the sensor 106. In one embodiment, the shutter generator 109 will generate a low shutter value when the sensor 106 receives light of high intensity and generate a high shutter value when the light is dimmer in accordance to the exposure algorithm within the sensor 106. Hence the shutter value recorder 108 will register different shutter values for the light incident from the light source 102 and the ambient light 103. Therefore, if a finger 105 placed on the detection area 101, the light emitted by the light source 102 will be reflected onto the sensor 106 and the sensor 106 is expected to produce signals having the same pattern as the light pattern of the light pulses emitted by the light source 102. Conversely, if there is no finger 105 on the detection area 101 to reflect the light pulses emitted by the light source 102, the incident light 107, if any, received by the sensor 106 will be ambient light 103.

The pattern detection engine 110 is coupled with the sensor 106 and the current controller 104, configured to receive the signal from the sensor 106 and drive current pattern from the current controller 104, and subsequently report the presence of the object upon determining the presence of the pattern in the signal. The pattern detection engine 110 may further include a ratio calculator 111 to calculate a transmission ratio 112 for the high to low intensities of the drive current and a detection ratio 113 for the high to low signal intensities generated by the sensor 106. In one embodiment, the pattern detection engine 110 has a presence indicator 114 operable to report the presence of the finger 105 upon determining the transmission-detection ratio is effectively equal to one or within an allowable variance. This would be associated with the finger 105 blocking a measurable portion of ambient light 103, if any, and reflecting light pulses emitted by the light source 102 back onto the sensor 106. In another embodiment, the pattern detection engine 110 is operable to report the absence of the object upon determining the detection ratio or the high to low intensities of the signal is effectively equal to one. Such a situation occurs when the signal intensities, at times of high intensity emissions from light source 102 and at times of low intensity emissions from light source 102, are identical or nearly so. In the special case where a ratio results in a zero over zero comparison, the ratio may be considered as one.

Figure 2:
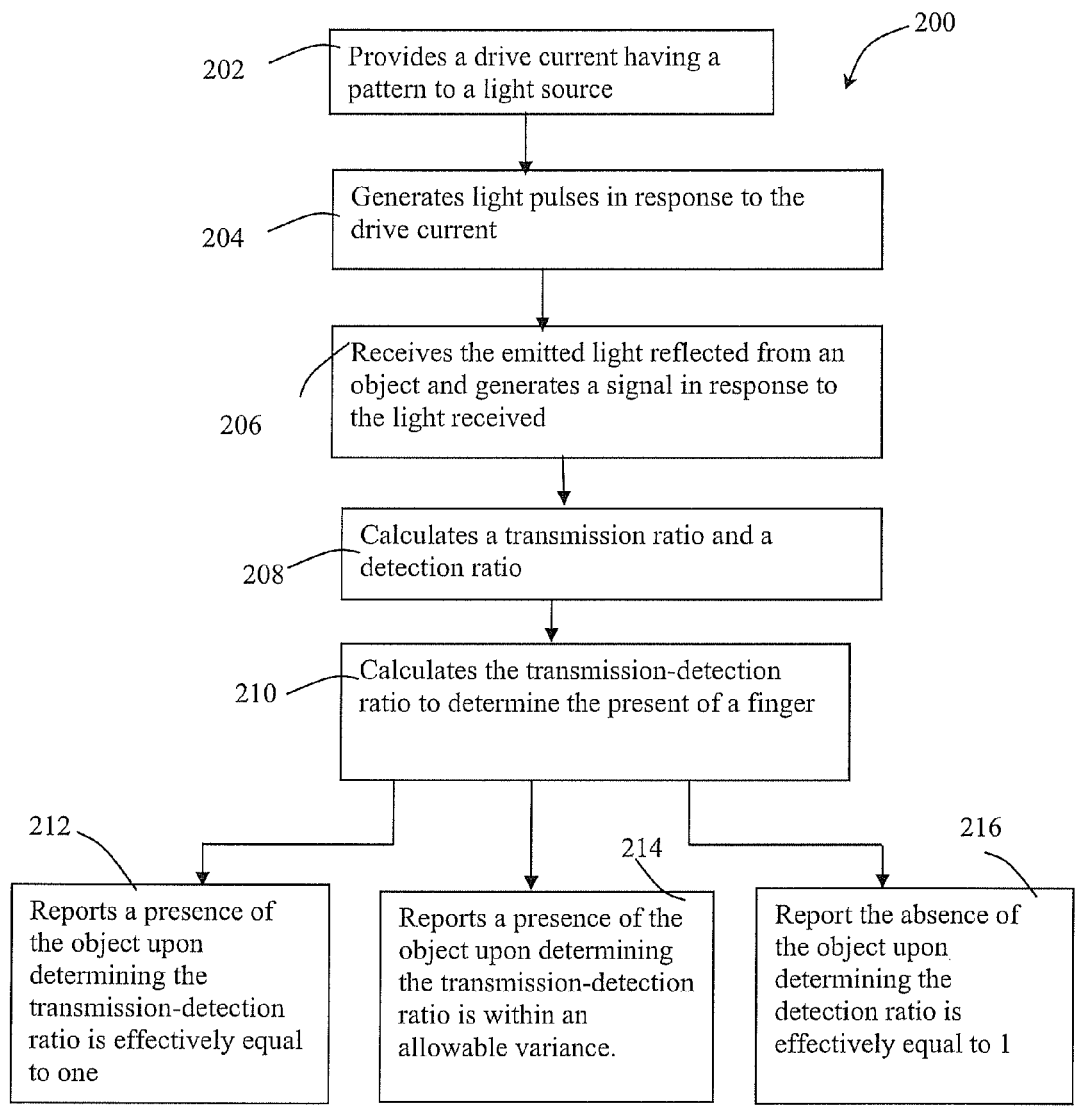
FIG. 2 illustrates a block diagram of one embodiment of a method for object detection.

FIG. 2 illustrates a block diagram of one embodiment of a method 200 for object detection. At block 202, the current controller 104 provides a drive current having a pattern to a light source 102 and causes the light source 102 to generate light in response to the drive current as represented by block 204. At block 206, the sensor 106 receive the emitted light reflected from an object, if present, and generates a signal in response to the light received. At block 208, the pattern detection engine 110 calculates the transmission ratio 112 for the high to low intensities of the drive current and a detection ratio 113 for the high to low intensities of the signal generated by the sensor 106. At block 210, the pattern detection engine 110 calculates the transmission-detection ratio to determine the present of a finger 105. At block 212, the pattern detection engine 110 reports a presence of the object upon determining the transmission-detection ratio is effectively equal to one. The presence of a finger 105 on the object detection area 101 will reflect the light generated by the light source 102 onto the sensor 106, hence detection ratio 113 for the high to low signal intensities generated by the sensor 106 is expected to be of similar value as the transmission ratio 112 for the high to low intensities of the drive current provided to the light source 102.

In another embodiment, at block 214, the pattern detection engine 110 reports a presence of the object upon determining the transmission-detection ratio is within an allowable threshold. At an instance when there is incomplete coverage of the object detection area 101, a small amount of ambient light may fall onto the sensor 106 which subsequently causes the transmission ratio 112 and the detection ratio 113 to be different.

In another embodiment, at block 216, the pattern detection engine 110 reports an absence of an object if the detection ratio 113 is effectively equal to one. When there is nothing on the object detection area 101, the ambient light 103 which is substantially constant will fall onto the sensor 106 and cause the sensor 106 to generate a substantially similar signal value, therefore the detection ratio 113 will be effectively equal to one.

Figure 3:
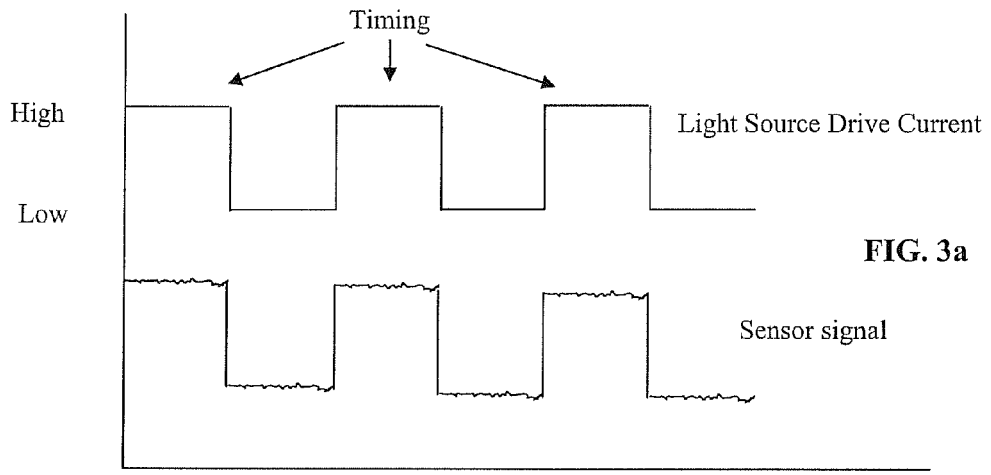
FIG. 3 illustrates wave diagrams for various embodiments of drive current timings and sensor signals.
Figure 3:
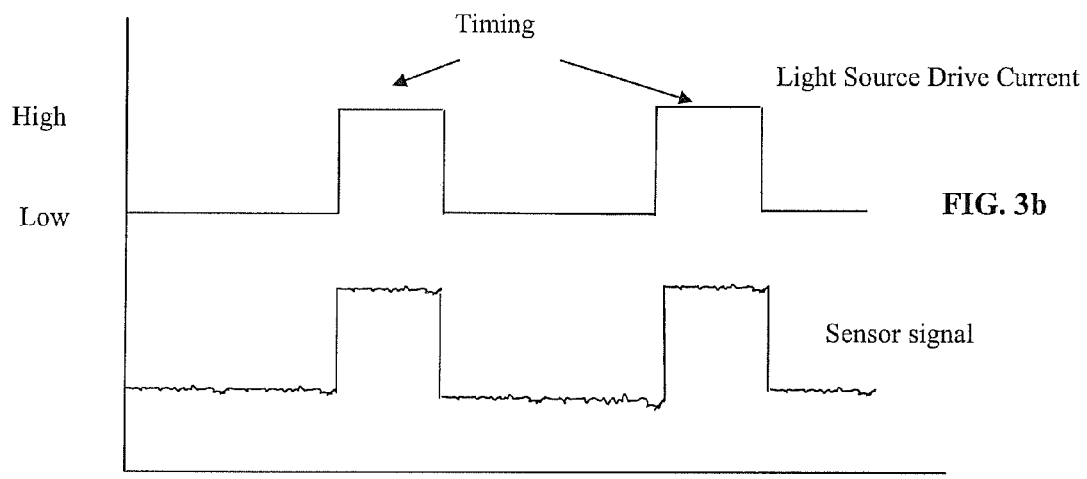
Figure 3:
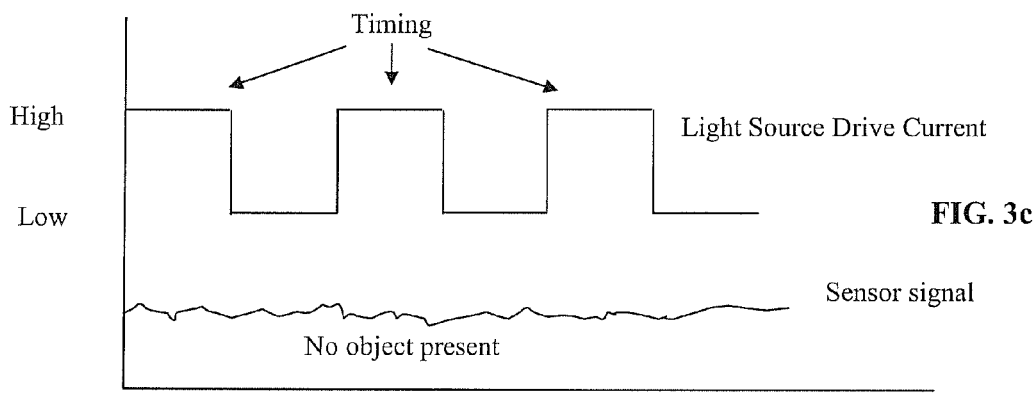

FIG. 3 illustrates wave diagram embodiments having various drive current timings and sensor signals. FIG. 3*a* shows an example of a drive current pattern consisting of alternating high and low intensities with a known timing. When the current controller 104 is configured to provide the light source 102 with a drive current of alternating high and low intensities to generate light pulses, and if there is a finger 105 at the detection area 101 to reflect the light pulses onto the sensor 106, in response to the light received, the sensor 106 will generate signals having the same pattern as the light pulses pattern. FIG. 3*b* shows another embodiment where the current controller 104 is configured to provide the light source 102 with drive current of alternating high and low intensities having a different timing, again if there is a finger 105 at the detection area 101 to reflect the light pulses onto the sensor 106, the sensor is expected to produce signals having the same pattern as that emitted from the light source 102. FIG. 3*c* shows an alternative embodiment whereby there is no finger 105 on the detection area 101 to reflect the light pulses unto the sensor 106. If the current controller 104 is configured to provide the light source 102 with a drive current having alternating high and low intensities, and no object is present at detection area 101, the light pulses emitted by the light source 102 will not be reflected unto the sensor 106, therefore the incident light 107, if any, received by the sensor 106 will be ambient light 103 which is substantially constant. As a result, the sensor signals will also be substantially constant and the signal pattern will be different from the light pulses pattern.

The pattern is variously embodied, and may include any pattern that can be emitted from light source 102 and detected by sensor 106 after being reflected from finger 105. Other pattern embodiments include (a) periods of long high intensity and less frequent dips to lower intensity; (b) an analog signal (e.g., a sine wave), wherein the high intensity portion includes the crest and the low intensity portion includes the trough; (c) complex waves (e.g., sawtooth); (d) low intensity portions that are, or nearly are, zero; and (e) pulses, to the high or to the low, of very short duration (spikes).

Figure 4:
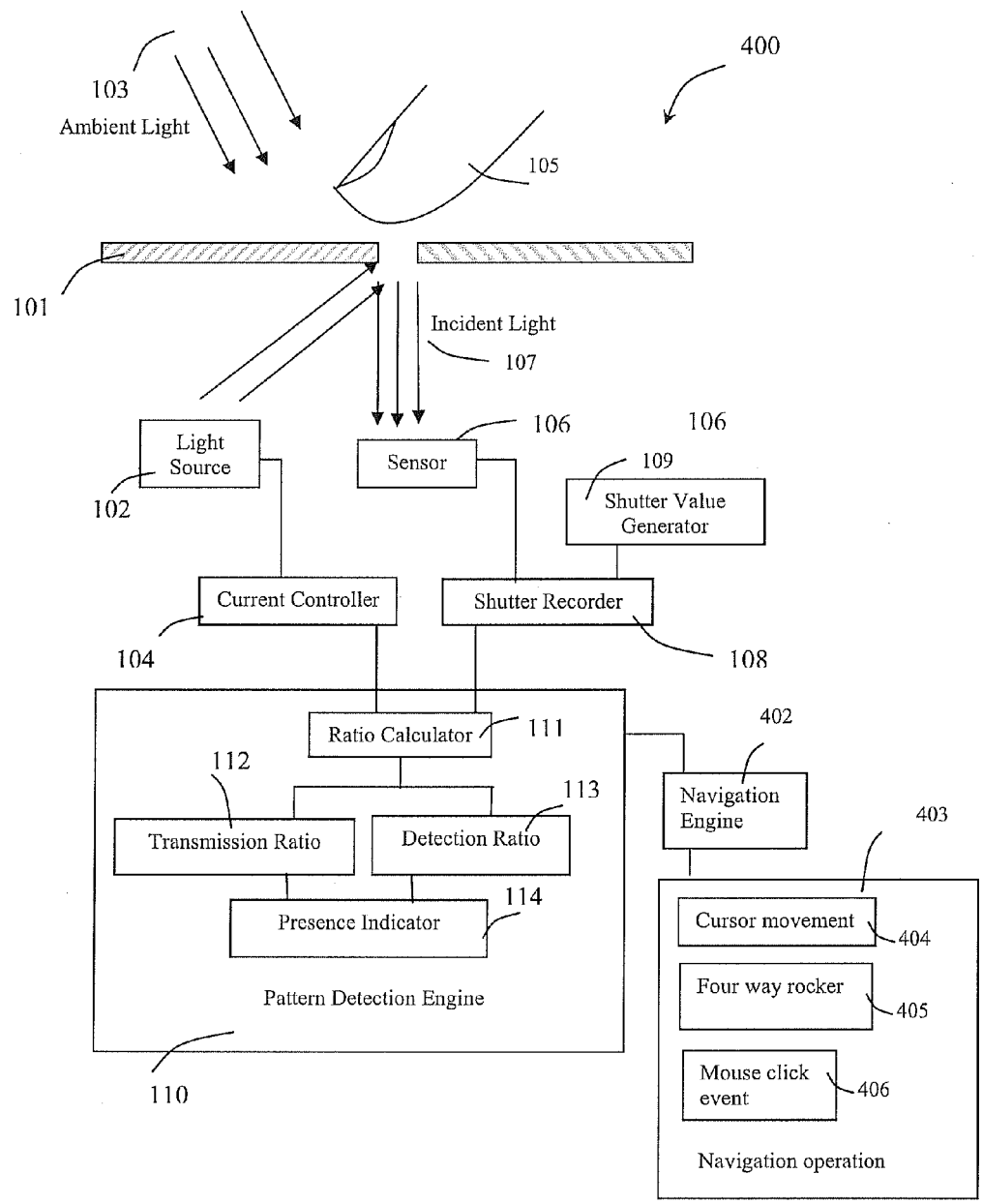
FIG. 4 illustrates a schematic block diagram of one embodiment of an optical finger navigation system.

FIG. 4 shows a schematic block diagram of one embodiment of an optical navigation system 400. In this embodiment, the pattern detection engine 110 is operatively coupled to a navigation engine 402 to provide a number of navigation operations 403 such as a controlling a cursor movement 404, providing a mouse click event 406 or providing a four way rocker 405. The pattern detection engine 110 has been described with respect to FIG. 1 and FIG. 2. In one embodiment, the navigation operation 403 is configured to operate only when a finger 105 has been reported present at the detection area 101 by the pattern detection engine 110. For example, in an optical finger navigation device with a sensor that is facing up, or otherwise operable to receive ambient light 103 when no object 105 is present, ignores navigation signals received by sensor 106 when no object, such as finger 105, is present. As a result, unwanted motion that would otherwise be caused by ambient light noises may be effectively reduced or eliminated.

In another embodiment, the navigation engine 402 is configured to recognize a pattern or a sequence of movement made by the finger 105 at the detection area 101. The pattern or the sequence of movement generated by the finger 105 may be used to emulate navigation functions such as a cursor movement 404, four way rocker 405 or a mouse click event 406. For example, the four way rocker 406 may be emulated by swiping and holding the finger 105 against the object detection area 101, and the stepping function may be stopped only when the finger 105 is being lifted. The navigation engine 402 may also be coupled with the pattern detection engine 110 to emulate a mouse click event 406, the left click or a right click mouse function may be emulated by a defined set of tapping sequences or a pattern of finger movements at the object detection area 101. For example, the left click can be emulated by a quick tap, whereas the right click function can be emulated by a finger tap and hold without a motion for a period.

Figure 5:
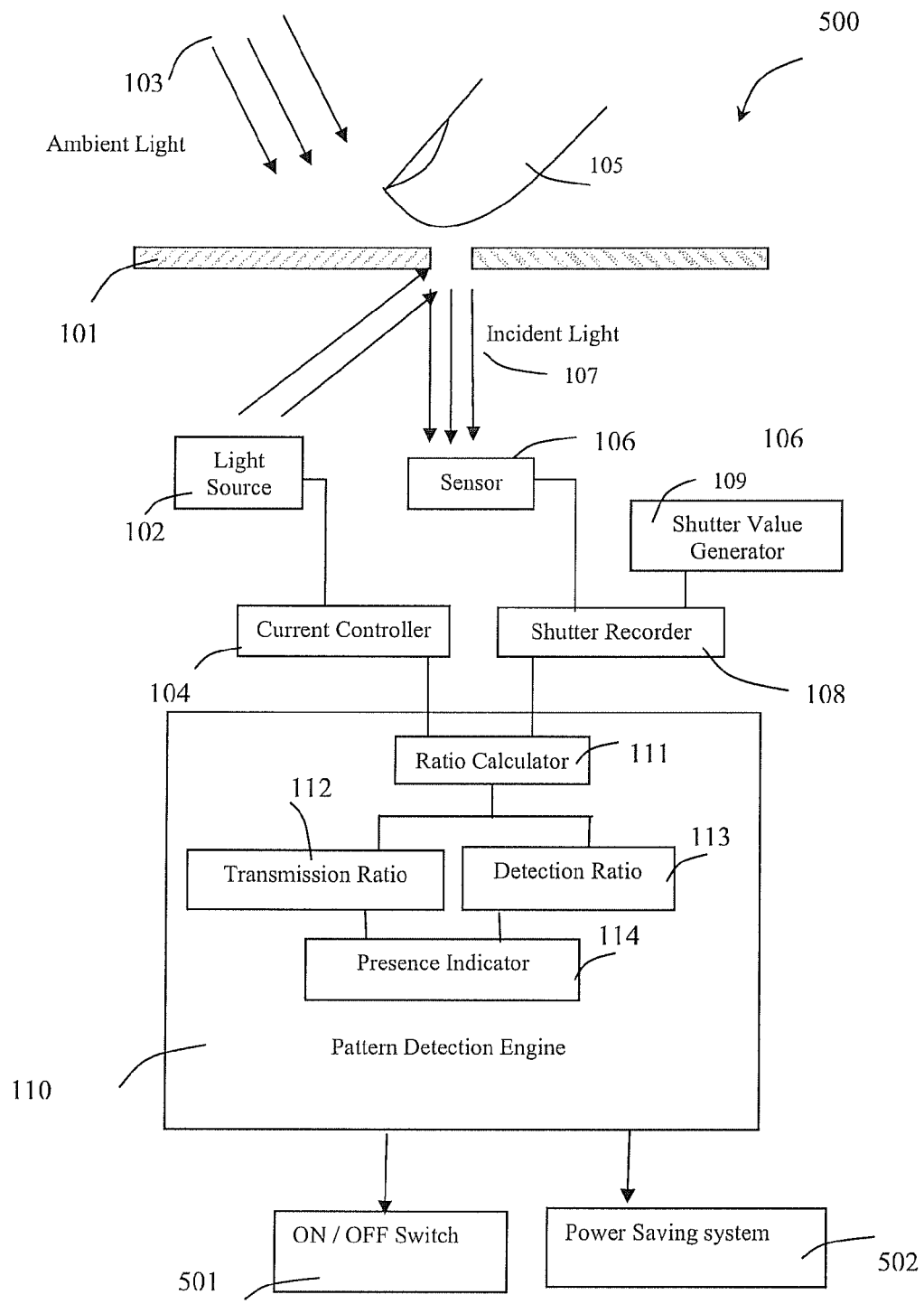
FIG. 5 illustrates a block diagram of one embodiment of an object detection device.

It should be understood that integration of the finger detection engine 110 can be extended beyond the application for an input navigation device. FIG. 5 illustrates a block diagram of one application of object detection device 500. In the illustrated embodiment, the pattern detection engine 110 can be used as an on or off switch 501 for a number of electronic devices. For example, the on/off switch 501 can be configured to response only to a specific light pulses emitted by the light source 102 and thereby be immune to other sources of light such as ambient light 103. The pattern detection engine 110 may be configured to function upon the pattern detection engine reporting a change in the presence or absence of the object. The on/off switch can be configured to response only to the reflected light pluses from the light source 102 due the presence of a finger 105 at the object detection area 101 or at the proximity of the device, therefore any false motion that may be triggered by the ambient light 103 which might compromise the accuracy of such switch can be effectively reduced.

In another embodiment, the pattern detection engine 110 can be configured as a portion of a power saving system 502 operable to regulate the power consumption of an appliance. The power saving system 502 can be configured either to switch off the device or put the device under power saving mode once the user's finger has been lifted. In one embodiment, the power saving system 502 is coupled with the pattern detection engine 110 configured to sense the different light brightness level of the environment and subsequently switch the device to different power saving modes. For example, the power saving system 502 can be used in a portable device for switching the LCD display to different levels of power saving modes. The power saving system 502 may be configured to read different shutter value thresholds registered by the sensor 106 which is corresponded to the lighting conditions, and configured to provide an appropriate current supply to the LCD for power saving purpose.

Although the operations of the method(s) herein are shown and described in a particular order, the operation's order of each method may be altered so that certain operations may be performed in an inverse order or so that certain operations may be performed, at least in part, concurrently with other operations.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An object detection device comprising:
   a current controller operable to generate a drive current having a pattern;
   a light source operable to emit light in response to the drive current;
   a detection area configured to be illuminated by the light source;
   a sensor array configured to receive the emitted light reflected from an object at the detection area and generate signals in response to the light received;
   a shutter value generator configured to generate shutter values from the signals;
   a shutter recorder to record the shutter values;
   a pattern detection engine configured to receive the shutter values from the shutter recorder and operable to report the presence of the object upon determining the presence of the pattern in the shutter values; and
   a navigation engine configured to provide a navigation operation in response to the signals from the sensor array.

2. The device of claim 1, wherein the pattern detection engine is operable to report the presence of the object upon determining the presence of the pattern in the signal within a predetermined tolerance.

3. The device of claim 2, wherein the navigation engine is configured to provide the navigation operation when an object is reported presence on the device.

4. The device of claim 1, wherein the pattern is alternating high and low intensities having a known timing.

5. The device of claim 4, wherein the pattern detection engine is configured to report the object being present upon determining the shutter values indicate at least one of (a) a high signal intensity at a timing corresponding to a high intensity emission of the light source and (b) low signal intensity at a timings corresponding to a low intensity emission of the light source.

6. The device of claim 4, wherein the pattern detection engine further comprises:
   a calculator operable to calculate,
   (a) a first ratio as the ratio of high to low intensities of the drive current,
   (b) a second ratio as the ratio of high to low signal intensities, wherein the second ratio is calculated from the shutter values, and
   (c) a transmission-detection ratio as the ratio of the first ratio to the second ratio; and
   a presence indicator operable to report the presence of the object upon determining the transmission-detection ratio is effectively equal to one.

7. The device of claim 4, wherein the pattern detection engine further comprises:
   a calculator operable to calculate a second ratio as the ratio of high to low signal intensities, wherein the second ratio is calculated from the shutter values; and
   a presence indicator operable to report the lack of presence of the object upon determining the second ratio is effectively equal to one.

8. The device of claim 1, wherein the device is a switch operable to switch on or off an appliance upon the pattern detection engine reporting a change in the presence or absence of the object.

9. The device of claim 1, wherein device is portion of a power saving system operable to regulate the power consumption of an appliance.

10. An object detection method comprising:
    generating a drive current having a pattern;
    providing the drive current to a light source;
    receiving a light reflected from an object at a detection area;
    generating signals in response to the light received;
    generating shutter values from the signals;
    determining that the pattern is present in the shutter values; and
    reporting the presence of the object;
    providing navigation signals for a navigation operation in accordance with the light received.

11. The method of claim 10, further comprising providing the light source with an alternating high and low current with a known timing.

12. The method of claim 10, wherein the step of determining the pattern is present in the shutter values further comprises determining the pattern is present in the shutter values within a previously determined tolerance.

13. The method of claim 12, wherein the step of determining the pattern is present in the shutter values further comprises:
    calculating a first ratio as the ratio of high to low intensities of the drive current, calculating, from the shutter values, a second ratio as the ratio of high to low signal intensities, and calculating a transmission-detection ratio as the ratio of the first ratio to the second ratio; and
    determining the pattern is present in the signal upon determining the transmission-detection ratio is effectively equal to one.

14. The method of claim 10, wherein the step of determining the pattern is present in the shutter values further comprises:
    calculating, from the shutter values, a ratio as the ratio of high to low signal intensities, and determining the pattern is present in the signal upon determining the transmission-detection ratio is effectively not equal to one.

15. The method of claim 10, further comprising translating a number of gestures made by the object on the detection area to a navigation operation.

16. An optical finger navigation device, comprising:
    a light source operable for emitting light having a pattern;
    a sensor array configured to receive the emitted light reflected from a finger at a detection area and to generate signals in response to the light received;
    a shutter value generator configured to generate shutter values from the signals;
    a shutter value recorder configured to record the shutter values;
    a pattern detection engine configured to receive the shutter values from the shutter value recorder and operable to report the presence of the finger upon determining the presence of the pattern in the shutter values; and
    a navigation engine configured to provide a navigation operation in response to the signals.

17. The device of claim 16, wherein the navigation engine is configured to provide the navigation operation when the object is reported present on the optical finger navigation device.

* * * * *